No. 813,168. PATENTED FEB. 20, 1906.
J. PETERS.
NUT LOCK.
APPLICATION FILED JUNE 28, 1905.
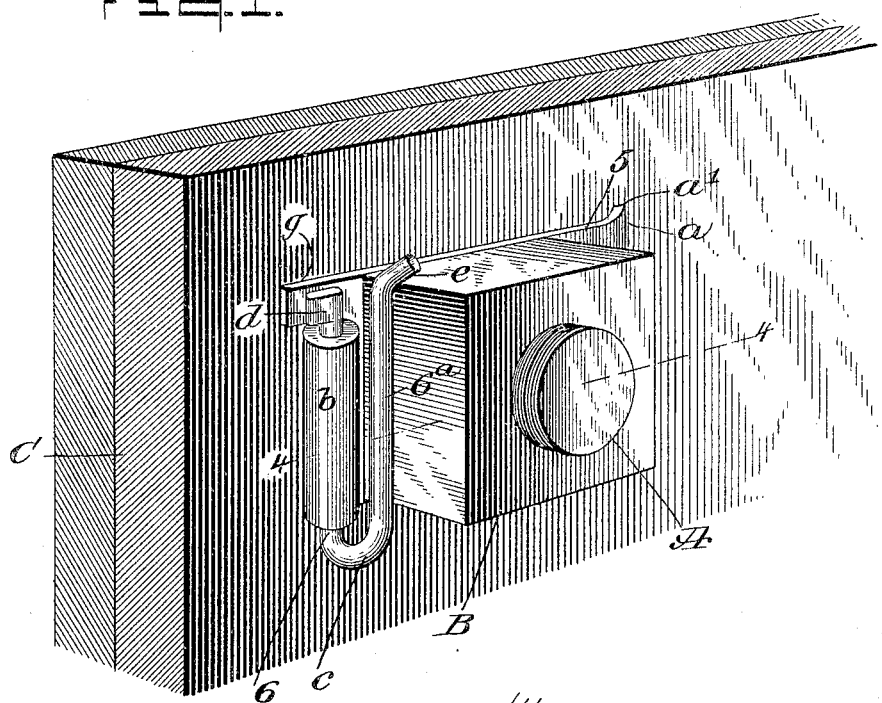
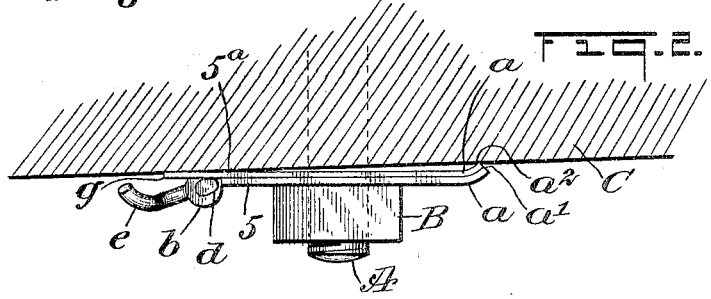
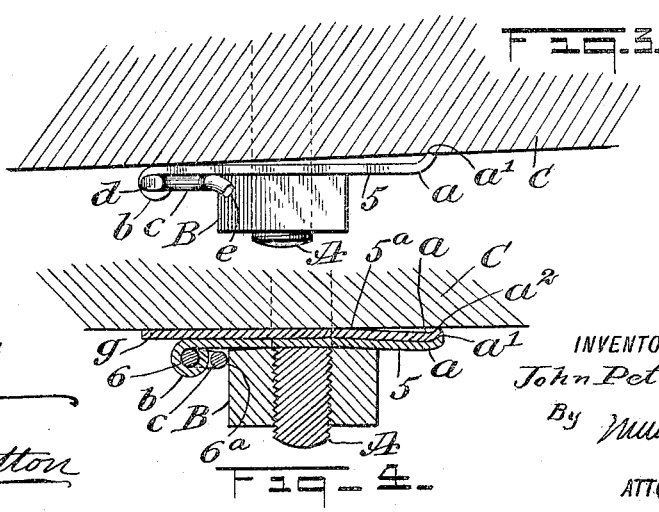
WITNESSES:
INVENTOR
John Peters,
By
ATTORNEYS

UNITED STATES PATENT OFFICE.

JOHN PETERS, OF BOTHWELL, CANADA, ASSIGNOR OF TWO-THIRDS TO ROBERT C. RUSSELL, OF ARTHUR, ONTARIO, CANADA.

NUT-LOCK.

No. 813,168.  Specification of Letters Patent.  Patented Feb. 20, 1906.

Application filed June 28, 1905. Serial No. 267,401.

*To all whom it may concern:*

Be it known that I, JOHN PETERS, a subject of the King of Great Britain, and a resident of Bothwell, in the county of Kent, in the Province of Ontario and Dominion of Canada, have invented a new and Improved Nut-Lock, of which the following is a full, clear, and exact description.

The object of this invention is to provide novel features of construction for a nut-lock that adapt it for general use to detachably secure a nut in a reliable manner on the threaded end of a bolt and permit the reuse of the nut-lock as often as may be desired.

The invention consists in the novel construction and combination of parts, as is hereinafter described, and indicated in the appended claims.

Reference is to be had to the accompanying drawings, forming a part of this specification, in which similar characters of reference indicate corresponding parts in all the figures.

Figure 1 is a perspective view of the improved nut-lock applied for securing a nut on the threaded end of a bolt. Fig. 2 is a plan view of the applied nut-lock, showing it adjusted for releasing the nut it normally locks. Fig. 3 is a plan view of the same adjusted for locking the nut; and Fig. 4 is a sectional plan view substantially on the line 4 4 in Fig. 1, showing details of the nut-lock and their relative arrangement.

In the drawings, A represents the end of a bolt threaded for the reception of a nut B, and C indicates material from which the bolt-body projects and upon which the nut when properly adjusted is to be held from turning.

A spring washer-plate 5 is an important detail of the improvement consisting of an oblong planchet of resilient plate metal having its mainly flat body curved laterally near one end, as shown at $a$, thus forming a toe that terminates in a sharp angularly or V shaped edge $a'$. The washer-plate 5 is perforated at a suitable point, that may be nearly central between its ends, said perforation being of a proper diameter for the free insertion therethrough of the bolt-body A. At the end of the washer-plate 5 opposite the one having the toe thereon a tubulation $b$ is formed transversely thereof, and in said tubulation one member of a U-shaped locking-dog is loosely secured. As shown, the locking-dog is formed from a metal rod bent into U shape at $c$, affording two members 6 $6^a$ nearly equal in length and spaced apart from each other, they being separated sufficiently to permit the member $6^a$ to swing freely at the outside of the tubulation $b$, in which the member 6 is loosely secured. Upon the end of the member 6 that extends above the tubulation $b$ a short ear $d$ projects laterally, and on the free upper end of the other member $6^a$ a short finger $e$ is bent in a direction nearly opposite the trend of the ear $d$.

The construction described and which appears in Fig. 3 represents the invention in its preferred form, which is well adapted for the locking of nuts on corresponding bolts to prevent the nut from retrograde turning movement.

In use the washer-plate 5 is strung upon the projecting end of the bolt A, and the V-shaped edge of the toe $a'$ is seated upon the material C, that may be wood or metal. The nut B is now screwed upon the projecting end of the bolt A until it forcibly bears upon the washer-plate 5, thus either bedding the toe $a'$ in the material C, if the latter is wood, or causing a frictional engagement of the toe therewith if the material C is metal, which prevents a displacement of the washer-plate. The turning and jamming of the nut upon the washer-plate, as described, should dispose the nut B so that one side of the same is parallel, or nearly so, with the dog member $6^a$ adjacent thereto. The member $6^a$ of the dog is now rocked toward the nut B, and the finger $e$ is disposed near the upper edge of the nearest side of the nut, while the body of said member of the locking-dog forcibly contacts with said side of the nut. It will be seen that this adjustment of the member $6^a$ of the locking-dog will hold the nut from a retrograde turning movement while the dog member $6^a$ is in the position shown, as the ear $d$ will coact with the dog member $6^a$ to prevent an accidental release of the latter from the nut, as by a rocking movement of the dog member $6^a$ the ear may be disposed in enforced engagement with the material C.

When nuts of considerable size are to be releasably secured by the improved nut-lock it is found advantageous to provide a reinforcing resilient washer-plate $5^a$, which supplements the action of the washer-plate 5, which has been described. The reinforcing washer-plate $5^a$ is similar in general character and shape and dimensions to the washer-plate 5, having a laterally-curved end $a$ and a locking-toe $a^2$ thereon; but the opposite end thereof is flat. A perforation is formed in the washer-plate $5^a$ at such a point as will cause it to register with the aperture in the plate 5 when the latter is imposed on the reinforcing washer-plate, as is clearly shown in Fig. 4, and, as represented in Figs. 1, 2, and 4, the flat end of the reinforcing washer-plate $5^a$ projects beyond the tubulation $b$ when the two washer-plates are placed together, as shown in Figs. 1, 2, and 4.

In service the reinforcing washer-plate $5^a$ is first placed upon the end of the bolt which passes through the perforation in said plate, and the toe $a^2$ is seated upon the material through which the bolt A is passed. The other washer-plate 5 is now mounted upon the projecting end of the bolt A and seated upon the plate $5^a$. Then the nut B is screwed upon the end of the bolt until the nut bears with proper force upon the washer-plate 5, the resilience of the two washer-plates 5 $5^a$ causing considerable friction between the material C and the washer-plate $5^a$, the toe $a^2$ bearing forcibly on said material. The washer-plate 5 is held from turning on the plate $5^a$ by the seated engagement of the curved portion $a$ of the plate 5 with a like curvature on the reinforcing washer-plate $5^a$. The member $6^a$ of the locking-dog is now rocked so as to impinge the dog member $6^a$ upon the side wall of the nut B with which said dog member has contact. The ear $d$ is brought into enforced contact with an extension $g$ on the flat end of the washer-plate $5^a$ when the member 6 of the locking-dog is rocked by the swinging movement of the other member $6^a$, which will hold the nut B from turning backward.

At any time it is desired to release the nut B this may be quickly effected by simply rocking the finger $e$ away from the nut, which will remove the dog-limb $6^a$ from the nut and allow the nut to be turned, the resilience of the projecting end portion of the washer-plate 5, whereon the tubulation $b$ is formed, adapting said end portion to yield and permit a rocking movement of the ear $d$ to be effected, which ear will then assume the position indicated in Fig. 2.

As the locking device may be removed without injury to it or to the nut and bolt upon which it has been mounted, it will be seen that the improved nut-lock may be reused an indefinite number of times and remain serviceable unless accidentally broken.

Having thus described my invention, I claim as new and desire to secure by Letters Patent—

1. A nut-lock comprising a plate having an opening to receive the bolt and having one of its ends bent laterally to form a projection, and having upon its other end a tubulation, a dog comprising an arm rotatably mounted on the tubulation and an arm for engaging the side of the nut, and a washer beneath the plate having a laterally-bent end to be engaged by the bent end of the plate.

2. A nut-lock comprising a plate having an opening to receive the bolt and having one of its ends bent laterally to form a projection for engaging the material through which the bolt is passed, whereby to prevent rotation of the plate, and having upon its other end a tubulation, and a dog comprising an arm rotatably mounted in the tubulation and an arm for engaging the side of the nut, the arm within the tubulation being provided with an ear whereby to limit the motion of the dog.

3. A nut-lock embodying an elongated washer-plate having a lateral curved portion thereon near one end, a tubulation on the opposite end of said washer-plate, a reinforcing washer-plate having a perforation between its ends and registering with a like perforation in the other washer-plate, a lateral curved portion on one end of said washer-plate and whereon the curved portion of the other plate bears, an angularly-shaped toe on the curved end of the reinforcing washer-plate, and a U-shaped locking-dog, one member of which is loosely held in the tubulation, the other spaced member thereof having a bent finger on its free end for turning said member toward or from a nut screwed upon a bolt passed through the opposite perforations in both of the washer-plates.

In testimony whereof I have signed my name to this specification in the presence of two subscribing witnesses.

JOHN PETERS.

Witnesses:
 FRANK POPE,
 OSCAR ADKIN.